United States Patent [19]

Okuda

[11] Patent Number: 5,793,163
[45] Date of Patent: Aug. 11, 1998

[54] DRIVING CIRCUIT FOR LIGHT EMITTING ELEMENT

[75] Inventor: Yoshiyuki Okuda, Saitama, Japan

[73] Assignee: Pioneer Electronic Corporation, Tokyo, Japan

[21] Appl. No.: 706,397

[22] Filed: Aug. 29, 1996

[30] Foreign Application Priority Data

Sep. 29, 1995 [JP] Japan .................................. 7-253227

[51] Int. Cl.$^6$ .................................................. G09G 3/10
[52] U.S. Cl. .................................. 315/169.2; 315/169.3; 315/226; 315/291; 345/76
[58] Field of Search .......................... 315/169.2, 169.3, 315/169.4, 126, 169.1, 205, 226, 291; 345/53, 94, 48, 55, 76–78, 82

[56] References Cited

U.S. PATENT DOCUMENTS

| | | | |
|---|---|---|---|
| 3,209,229 | 9/1965 | Cox, Jr. .................................. | 345/76 X |
| 4,291,369 | 9/1981 | Hochstrate .................................. | 363/60 |
| 4,642,524 | 2/1987 | Eaton et al. .................................. | 315/169.3 |
| 4,654,649 | 3/1987 | Kojima et al. .................................. | 315/169.4 X |
| 4,692,665 | 9/1987 | Sakuma .................................. | 315/169.4 |
| 5,075,596 | 12/1991 | Young et al. .................................. | 315/169.3 |
| 5,309,150 | 5/1994 | Ohba et al. .................................. | 345/76 |
| 5,442,260 | 8/1995 | Saito et al. .................................. | 315/241 P |

FOREIGN PATENT DOCUMENTS

| | | |
|---|---|---|
| 0 409 245 | 1/1991 | European Pat. Off. . |
| 2 724 468 | 3/1996 | France . |
| 2 105 085 | 3/1983 | United Kingdom . |

OTHER PUBLICATIONS

Electronic Design, vol. 42, No. 5, Mar. 7, 1994, p. 75 XP000443796; Belousov A L: "Inductor–Less LED Booster".

Primary Examiner—Robert J. Pascal
Assistant Examiner—Haissa Philogene
Attorney, Agent, or Firm—Sughrue, Mion, Zinn, Macpeak & Seas, PLLC

[57] ABSTRACT

In a circuit for driving a light emitting element, a switched capacitor circuit including a capacitor is connected between a power supply and the light emitting element. The capacitor in the switched capacitor circuit is charged to a power supply voltage when switches are exchanged to the sides of charging. The power supply is connected in series with the capacitor when the switches in the switched capacitor circuit are exchanged to the side of discharging. The power supply and capacitor connected in series therewith supplies the driving current to the light emitting element. Changing the number of times of exchange of the switches permits the driving current to flow into the light emitting element to be varied. Thus, the circuit for driving a light emitting element with excellent power-supply efficiency is provided which can drive a light-emitting element even when the power supply voltage for driving the light emitting element is lower than the forward voltage thereof.

3 Claims, 6 Drawing Sheets

CLOCK

DRIVING CIRCUIT FOR LIGHT EMITTING ELEMENT

BACKGROUND OF THE INVENTION

1. Field of the Invention

The present invention relates to a driving circuit for a light emitting element, and more particularly to a driving circuit which is suitably used to drive a light emitting element whose luminance varies in accordance with a flowing driving current, e.g. an LED (light emitting diode) and an organic EL (electroluminescence).

2. Description of the Prior Art

In the light emitting element such as LED and organic EL, when the driving current flowing into the element varies, its light-emitting luminance also varies undesirably. For this reason, the driving current flowing into the element must be controlled so that it is maintained constant.

FIG. 10 shows the first example of a conventional driving circuit. In this driving circuit, a constant current supply 3 intends to change the driving current, which is supplied to a light emitting element 2 supplied from a power supply 1 for driving it, into a constant current. It should be noted that the light emitting element 2 emits light when a switch 4 is open as indicated by solid line, and ceases to emit light when it is closed as indicated by dotted line.

FIG. 11 shows the second example of the conventional driving circuit. In this configuration, a high resistance 5, which is inserted in series between a light emitting element 2 and a power supply 1 for driving it, intends to control the driving current flowing through the light emitting element 2 to be constant. It should be noted that the light emitting element 2 emits light when a switch 6 is located at a position indicated by solid line and it ceases to emit light when the switch 6 is changed to another position indicated by dotted line.

In both driving circuits described above, the driving power supply 1 for a light emitting element 2 is required to have a power supply voltage Vcc which is higher than the forward voltage Vf of the light emitting element 2. This driving circuit, therefore, cannot be used when the power supply voltage Vcc is lower than the forward voltage Vf.

Meanwhile, setting the power supply voltage Vcc for a higher value than the forward voltage Vf results in wasteful power consumption corresponding to the difference therebetween, thereby deteriorating efficiency of power supply. This is very problematic in a portable or vehicle-mounted appliance in which a dry cell or battery is used as a power supply for driving the light emitting element. The forward voltage Vf of LED is as low as +1.5 V to +2 V and also relatively stable. On the other hand, that of the organic EL is as high as +6 V to 12 V and also greatly varies in accordance with luminance, temperature and time passage. Where the organic EL is used as a display of "car stereo", since a vehicle-mounted battery must be used as a power supply 1 for driving the light emitting element, as the case may be, the light emitting element, if the power supply is not boosted, cannot be driven.

SUMMARY OF THE INVENTION

An object of the present invention is to provide a driving circuit with excellent power-supply efficiency which can drive a light-emitting element even when the power supply voltage for driving the light emitting element is lower than the forward voltage thereof using a switched capacitor circuit.

In order to attain the above object, in accordance with the present invention, there is provided a driving circuit for a light emitting element, comprising a switched capacitor circuit connected between the light emitting element and a drive power supply therefor. In this structure, even when the power supply voltage is lower than the forward voltage of the light emitting element, the light emitting element can be driven to emit light. Thus, the driving circuit has excellent power-supply efficiency and hence can be stably used for a vehicle-mounted battery experiencing extreme voltage variations.

A saw-tooth wave generating circuit is preferably connected in series between a capacitor and ground of the switched capacitor circuit. In this structure, the driving current flowing into the light emitting element can be maintained constant which does not exceed the absolute maximum current of the light emitting element. The instantaneous maximum voltage of an output can be set for a lower point which does not exceed the withstand voltage of a drive IC.

A plurality of switched capacitor circuits are preferably connected in tandem in plural stages. In this structure, the light emitting element can be driven even when the forward voltage of the light emitting element is twice or more as high as the power supply voltage. This contributes to extend the application field of the driving circuit greatly.

A saw-tooth wave generating circuit is preferably connected in series between a capacitor and ground of the switched capacitor circuit at the first stage nearest to the drive power supply for the light emitting element. In this structure, even when the forward voltage of the light emitting element is twice or more as high as the power supply voltage, the driving current flowing into the light emitting element can be maintained constant which does not exceed the absolute maximum current of the light emitting element. The instantaneous maximum voltage of an output can be set for a lower point which does not exceed the withstand voltage of a drive IC.

The number of times of charging/discharging the switched capacitor circuit is preferably varied in accordance with the current flowing through the light emitting element. In this structure, the light-emitting luminance can be changed freely so that in accordance with the area of the light emitting element, the luminance can be set, thus permitting the tone to be represented.

The above and other object and features of the present invention will be more apparent from the following description taken in conjunction with the accompanying drawings.

DESCRIPTION OF THE PREFERRED EMBODIMENTS

Figure 1:
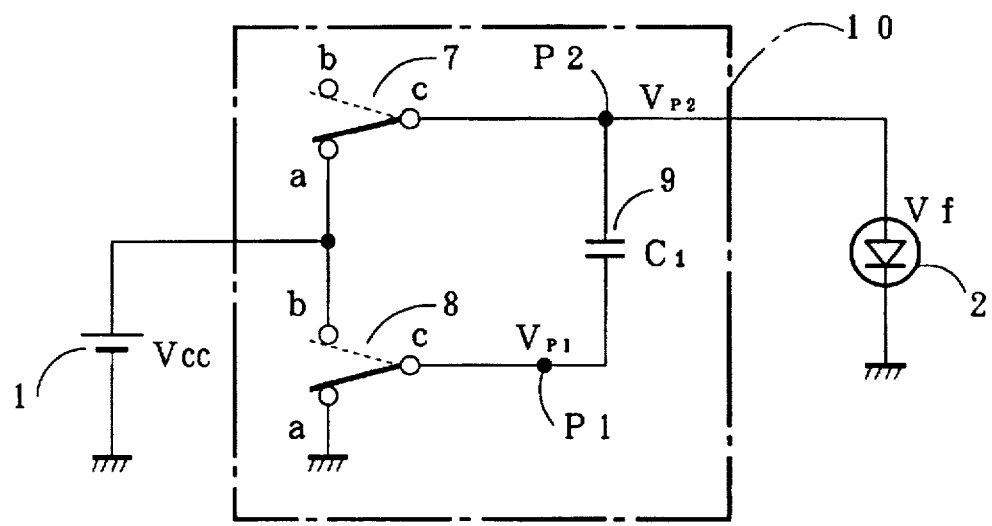
FIG. 1 is a circuit diagram showing the first embodiment of a driving circuit according to the present invention.

Now referring to the drawings, an explanation will be given of several embodiments of a driving circuit for a light emitting element according to the present invention.

Embodiment 1

FIG. 1 shows a first embodiment of a driving circuit according to the present invention. In FIG. 1, like reference numerals refer to like elements in FIGS. 10 and 11.

As seen from FIG. 1, in this embodiment, a switched capacitor circuit 10 is connected between a light emitting element 2 and a drive power supply 1 therefor. The switched capacitor circuit 10 includes two switches 7, 8 and a capacitor 9 sandwiched therebetween. Specifically, the anode of the drive power supply 1 is connected to terminal a of the switch 7 and terminal b of the switch 8, respectively. The terminal c of the switch 7 is connected to the anode of the light emitting element 2. A capacitor 9 having predetermined capacitance is connected between the respective terminals c of the switches 7 and 8. Incidentally, the terminal b of the switch 7 is opened and the terminal a of the switch 8 is connected to ground.

The switched capacitor circuit 10 appears to serve as an ordinary boosting circuit. But, as described below in detail, the switched capacitor circuit 10 does not serve as the ordinary boosting circuit for supplying 2 Vcc twice as large as a power supply voltage Vcc to load, but as a charge injecting circuit for once storing charges for light emission in the capacitor 9 from the drive power supply 1 and injecting the stored charges into the light emitting element 2.

An explanation will be given of the operation of the driving circuit according to this embodiment.

It is now assumed that Vcc<Vf<2 Vcc, i.e., the forward voltage Vf of the light emitting element 2 is larger than the power supply voltage Vcc, and smaller than twice of the power supply voltage Vcc. Therefore, even when the switched capacitor circuit 10 of FIG. 1 is removed and the drive power supply 1 is directly connected to the light emitting element 2, the light emitting element 2 cannot emit light.

Now it is assumed that two switches 7 and 8 within the switched capacitor circuit 10 have been exchanged to the respective terminals a as indicated in solid line. In this state (hereinafter referred to as "charged state"), the capacitor 9 is charged to a power supply voltage Vcc in a path consisting of the anode of the drive power supply 1, a-c terminal of the switch 7, capacitor 9, c-a terminal of the switch 8 and ground.

Assuming that the capacitor 9 has C1 of electrostatic capacitance, the charge of Q1=C1×Vcc is stored.

After a predetermined time, two switches 7 and 8 are exchanged to the side of the terminal b as illustrated in dotted line. In this state (hereinafter referred to as "discharged state"), the capacitor 9 is connected in series with the drive power supply 1 in a path consisting of the anode of the drive power supply 1, b-c terminal of the switch 8, light emitting element 2 and ground.

Because of this series connection, the potential Vp1 at point P1 on the side of the switch 8 of the capacitor 9 is boosted toward the power supply voltage Vcc. Correspondingly, the potential Vp2 at a position on the side of the light emitting element 2 is boosted toward 2 Vcc. In this case, since the light emitting element 2 is connected to the point P2 as load, when the voltage Vp2 at point of P2 reaches the forward voltage Vf of the light emitting element 2, charges start to flow to the light emitting element 2 from the capacitor 9, thus starting light emission of the light emitting element 2. Therefore, the voltage Vp2 is not boosted to exceed the forward voltage Vf of the light emitting element 2. After lapse of a predetermined time, two switches 7 and 8 are exchanged to the side of the respective terminals a (side of charged state) again.

The charges Q flowing towards the light emitting element 2 when the discharging operation is once effected is $$Q = C1 \times Vd \quad (1)$$

where Vd=2 Vcc−Vf

Figure 9:
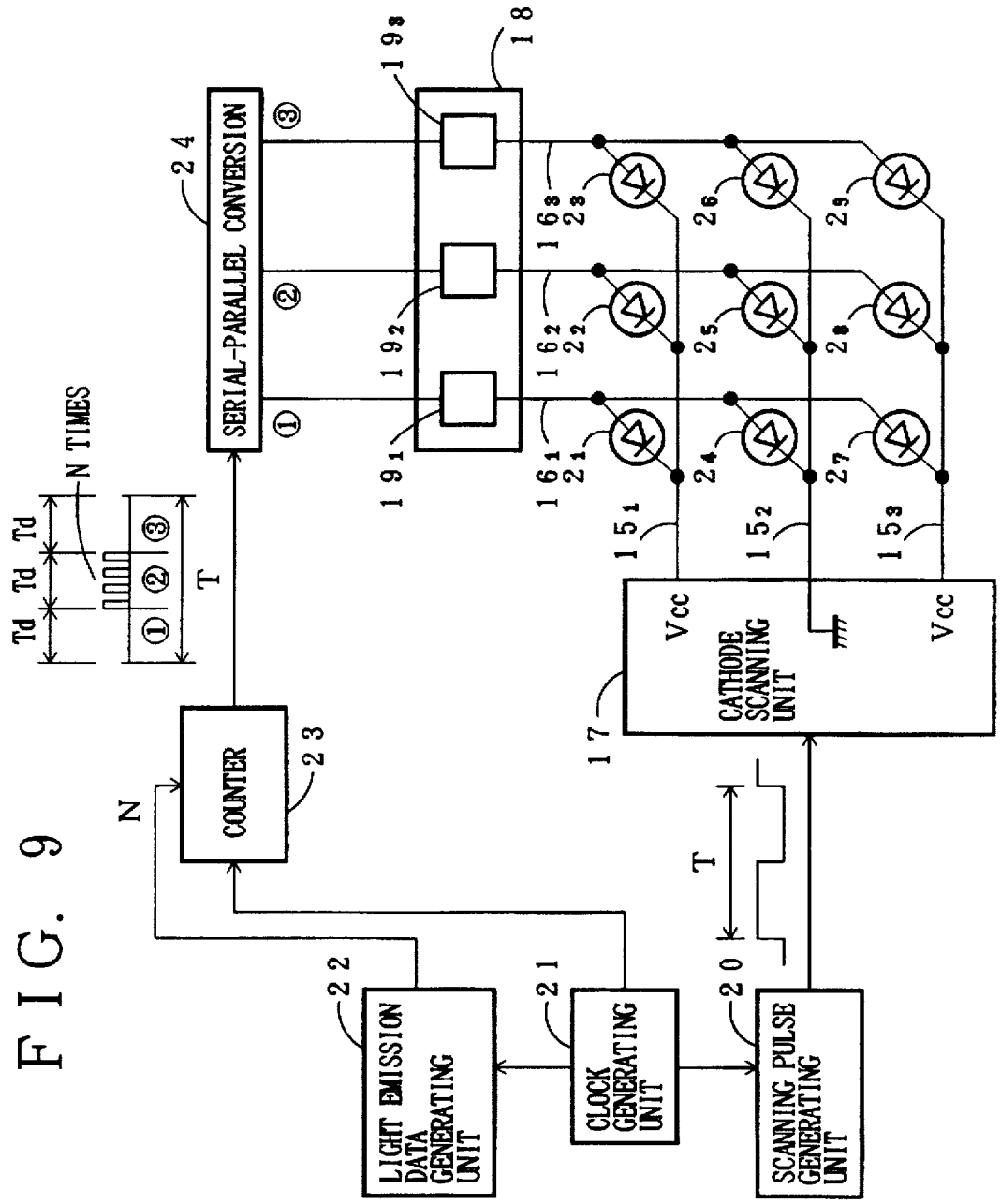
FIG. 9 is a block diagram showing an example of a simple matrix display system configured using the driving circuit according to the present invention.

The light emitting element 2, as described later in connection with FIG. 9, is arranged in a matrix shape together with other light emitting elements. The light emitting element 2 is commonly driven by a "matrix system" in which a driving voltage is sequentially applied to the light emitting elements at cross points in the matrix to emit light. Assuming that the driving time T1 assigned for a single light emitting element is Td, the switches 7 and 8 are exchanged N times within the driving time T1 to effect the charging/discharging operation N times, the average value I of the driving current flowing into the light emitting element 2 is expressed by $$I = (Q \times N)/Td = (C1 \times Vd \times N)/Td \quad (2)$$

As apparent from Equation (2), if the number N of times of exchange of the switches 7 and 8, the average value of the driving current flowing into the light emitting element 2 can be varied. Thus, the luminance of the light emitting element 2 can be altered so that in the driving circuit using the switched capacitor circuit 10, the same luminance can be obtained as in the conventional circuit.

Figure 2:
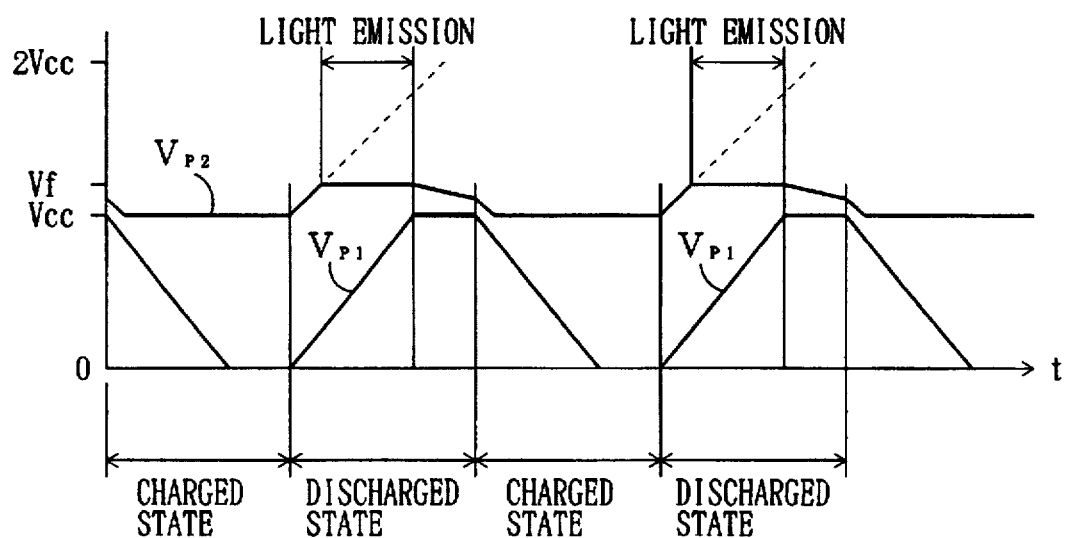
FIG. 2 is an operation waveform chart of the embodiment of FIG. 1.

FIG. 2 is a waveform chart of the voltage Vp1 at the point of P1 and the voltage Vp2 at the point P2 in FIG. 1. The voltage Vp1 at the point P1 goes back and forth between 0 V (ground) and power supply voltage Vcc. The waveform of the voltage Vp1 is shown in a trapezoid shape, considering the slew rate of the circuit. On the other hand, the voltage Vp2 at the point P2 remains the power supply voltage Vcc during the charged state where the switches 7 and 8 are exchanged to the terminals of a.

When the switches 7 and 8 are exchanged to the terminals of b to lead to the discharged state, the voltage Vp2 at the point P2 is boosted towards 2 Vcc in parallel to voltage Vp1. When the voltage VP2 reaches the forward voltage Vf of the light emitting element 2, charges start to flow from the capacitor 9 to the light emitting element 2. At this time, boosting of the voltage stops. Simultaneously when discharging starts, the light emitting element 2 starts to emit light.

After a predetermined time, the voltage Vp1 at the point P1 reaches a power supply voltage Vcc, the voltage Vp2 at the point P2 is gradually lowered as discharging of the capacitor 9 proceeds. At this time, charges sufficient to cause the light emitting element 2 emit light are not discharged.

When the voltage Vp2 at the point P2 reaches the power supply voltage Vcc, the light emitting element 2 substantially ceases to emit light. Discharging of the capacitor 9 further proceeds so that the voltage Vp2 at the point P2 is lowered toward the power supply voltage Vcc. Then, since the amount of discharged charges is small, the light emitting element 2 is not caused to emit light.

After a predetermined time, the switches 7 and 8 are exchanged to the terminals a to lead to the charged state, the capacitor 9 is charged again by the power supply voltage Vcc of the driving power supply 1 for preparation of a next discharging operation. The above charging/discharging operation is repeated so that the light emitting element 2 emits light at a predetermined luminance.

Figure 3:
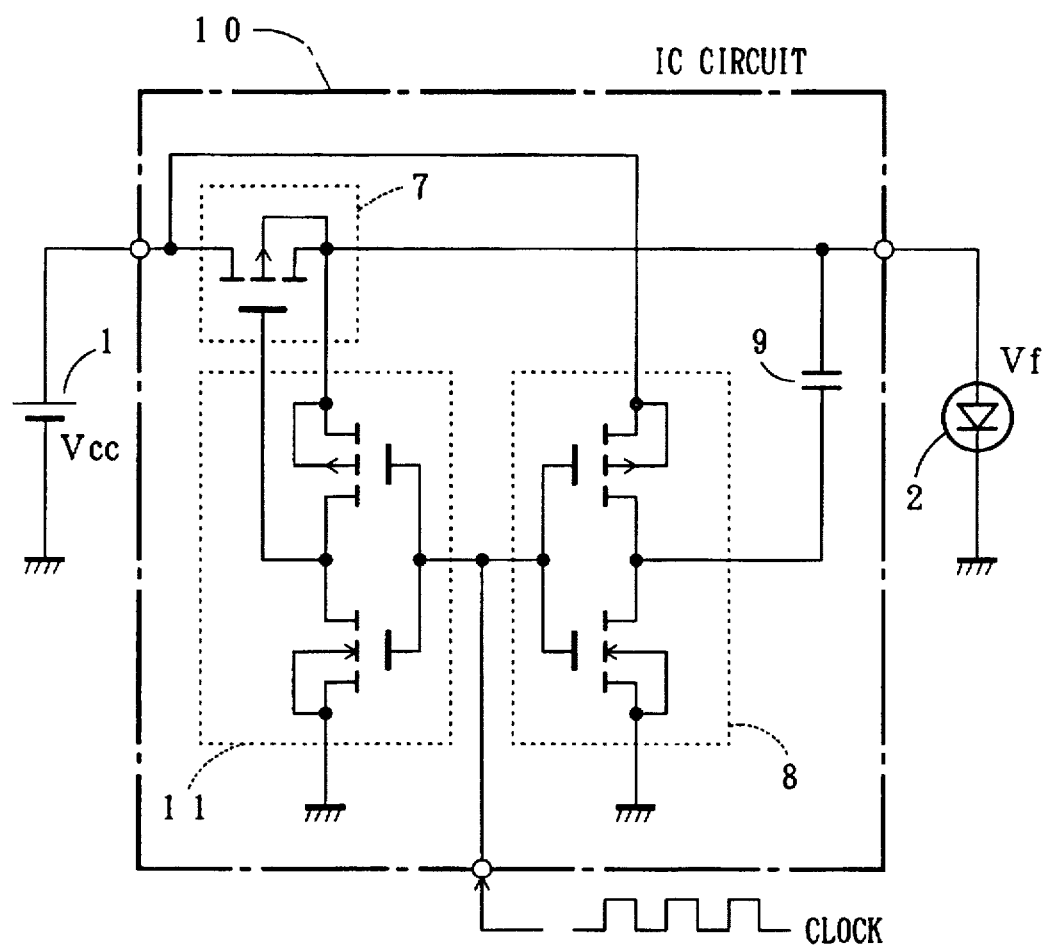
FIG. 3 is a circuit diagram when the first embodiment is configured into an integrated circuit (IC)

FIG. 3 shows an example in which the switched capacitor 10 of the driving circuit of FIG. 1 is IC-ed (integrated-circuited) using C-MOS's. In this figure, although it appears that the capacitor 9 is not IC-ed, in an actual circuit, the capacitor 9 can be integrally formed on a substrate through an IC process of CMOS. The entire circuit of the switched capacitor circuit 10 is IC-ed into a single chip. The driving circuit according to the present invention is suited to mass production, and is miniaturized. In FIG. 3, the portion indicated by reference numeral 11 denotes a clock-phase inverting circuit for turning ON/OFF the switch 7.

Embodiment 2

Figure 4:
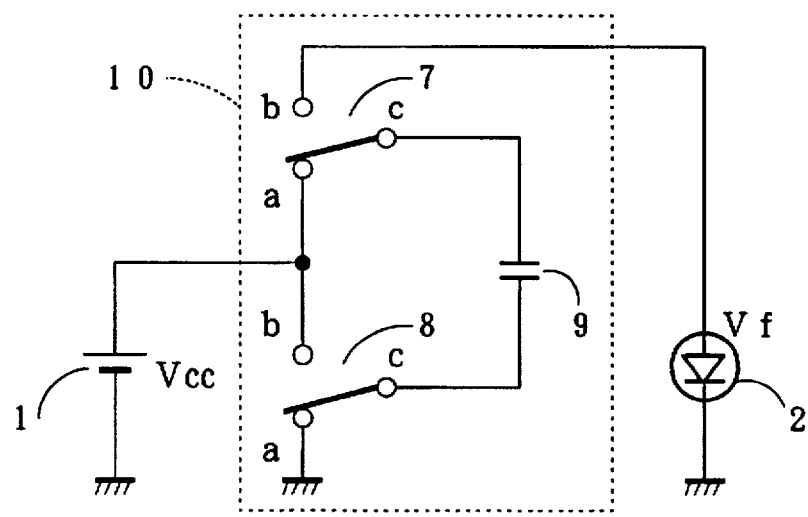
FIG. 4 is a circuit diagram of the second embodiment of a driving circuit according to the present invention.

FIG. 4 shows a second embodiment of the driving circuit according to the present invention. The second embodiment is a modification of the driving circuit of FIG. 1. In the driving circuit of FIG. 1, the terminal c of the switch 7 is connected to the light emitting element 2 of the switch 7, whereas in the driving circuit of FIG. 4, the terminal b is connected to the light emitting element 2. In the case of such a connection, since the power supply voltage Vcc is not entirely applied to the light emitting element 2 in the charged state when the switches 7 and 8 have been exchanged to the respective terminals a, leakage of charges in charging can be removed.

Embodiment 3

Figure 5:
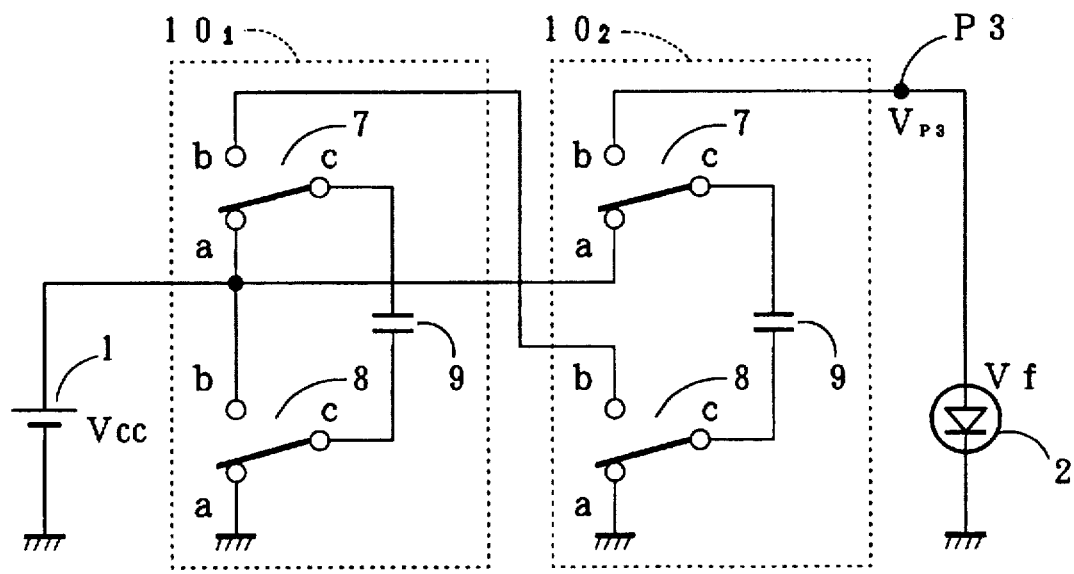
FIG. 5 is a circuit diagram of the third embodiment of a driving circuit according to the present invention.

FIG. 5 shows the third embodiment of the present invention. In this embodiment, between the driving power supply 1 and the light emitting element 2, two switched capacitor circuits $10_1$ and $10_2$ are connected in tandem. This driving circuit is suited to the case where 2 Vcc<Vf<3 Vcc, i.e., the forward voltage Vf of the light emitting element 2 is larger than twice and smaller than three-times of the power supply voltage Vcc.

The switches 7 and 8 in the switched capacitor circuit $10_1$ and those in the switched capacitor circuit $10_2$ are exchanged synchronously, in the state (charged state) exchanged to the terminals a, the capacitor 9 in each of the circuits has been charged to the power supply voltage Vcc. When the switches 7 and 8 in each of both switched capacitor circuits are exchanged to the terminal b (discharged state), two capacitors 9 and 9 are connected in series with the driving power supply 1, the voltage Vp3 at point P3 is boosted towards 3 Vcc. When the voltage Vp3 at the point P3 reaches the forward voltage Vf of the light emitting element, the light emitting element 2 starts to emit light.

In the driving circuit of FIG. 5, assuming that two capacitors 9, 9 have equal values C1, the composite electrostatic capacitance C0 when they are connected in series in discharging is C0=C1/2. Therefore, in the driving circuit of FIG. 5, the charges Q to flow towards the light emitting element 2 when the discharging operation is once effected is expressed by $$Q = C0 \times Vd \tag{3}$$

where Vd=3 Vcc−Vf

Then, the average value of the driving current flowing through the light emitting element 2 is expressed by $$I = (Q \times N)/Td = (C0 \times Vd \times N)/Td \tag{4}$$

As understood from Equation (4), also in the driving circuit of FIG. 5, like the circuit of FIG. 1 described above, by controlling the number N of times of exchange of the switches 7 and 8, the light-emitting luminance of the light emitting element 2 can be varied. It is needless to say that the capacitors 9, 9 within each of the switched capacitor circuit $10_1$ and $10_2$ may have different electrostatic capacitances.

Embodiment 4

Figure 6:
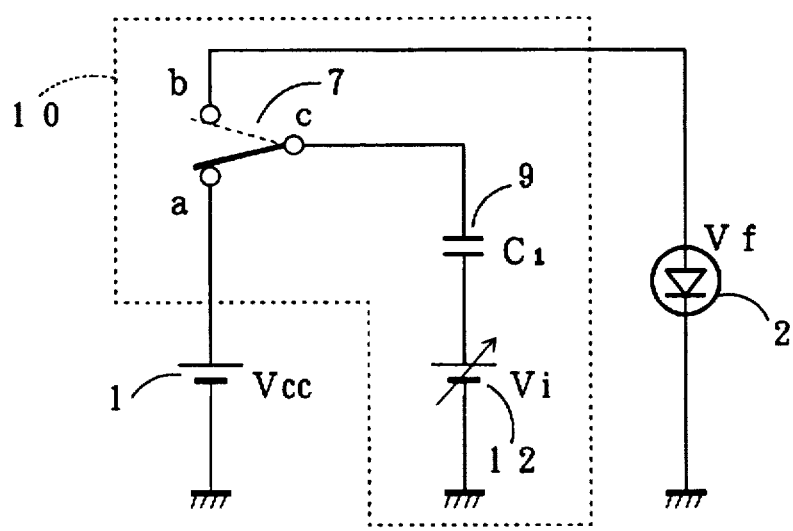
FIG. 6 is a circuit diagram of the fourth embodiment of a driving circuit according to the present invention.

FIG. 6 shows the fourth embodiment of a driving circuit according to the present invention.

This embodiment is such a circuit that in the driving circuit of FIG. 4, a saw-tooth wave generating circuit 12 is connected instead of the switch 8 between the capacitor 9 and ground.

In the case of the driving circuit shown in FIG. 1 or FIG. 4, the average value I of the driving current supplied to the light emitting element 2 is expressed by Equation (2) or (4). However, this current is an average value within a certain period. The instantaneous driving current i0 which starts to flow from the capacitor 9 becomes gradually small as discharging of the capacitor 9 proceeds. This means that the light emitting luminance of the light emitting element 2 varies. In the case of the driving circuit of FIG. 1 or FIG. 4, the light emitting element 2 gives a satisfactory average luminance. Therefore, if the instantaneous driving current i0 can be made constant while the capacitor 9 discharges, the luminance of the light emitting element 2 can also be made constant. Thus, the driving current can be easily controlled so that it does not exceed the absolute maximum current of the light emitting element 2, and the instantaneous maximum voltage at the point P3 can be reduced.

Figure 7:
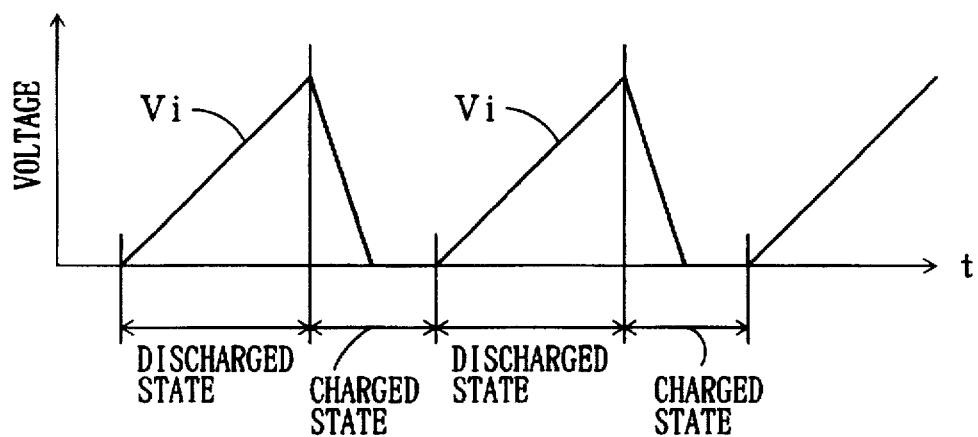
FIG. 7 is a waveform chart of the saw-tooth voltage produced from a saw-tooth wave generating circuit in the driving circuit of the fourth embodiment.

For this purpose, in the driving circuit of FIG. 6, the saw-tooth wave generating circuit is connected between the capacitor 9 and ground. In operation, after the switch 7 is exchanged to the terminal b, the saw-tooth wave generating circuit 12 generates a saw-tooth wave voltage as shown in FIG. 7. This saw-tooth wave voltage is used to compensate for the voltage drop of the capacitor 9 due to its discharging, thereby capable of maintaining the instantaneous value i0 flowing into the light emitting element 2 constant during the discharging period.

Specifically, assuming that the saw-tooth wave voltage outputted from the saw-tooth generating circuit 12 is Vi, the instantaneous current i0 which starts to flow from the capacitor 9 to the light emitting element 2 in discharging is expressed by $$i0 = C1 \times (dVi/dt) \tag{5}$$

Since the gradient of the saw-tooth wave voltage Vi is constant, (Dvi/dt) in Equation (5) is also constant, and hence i0 becomes constant.

Figure 8:
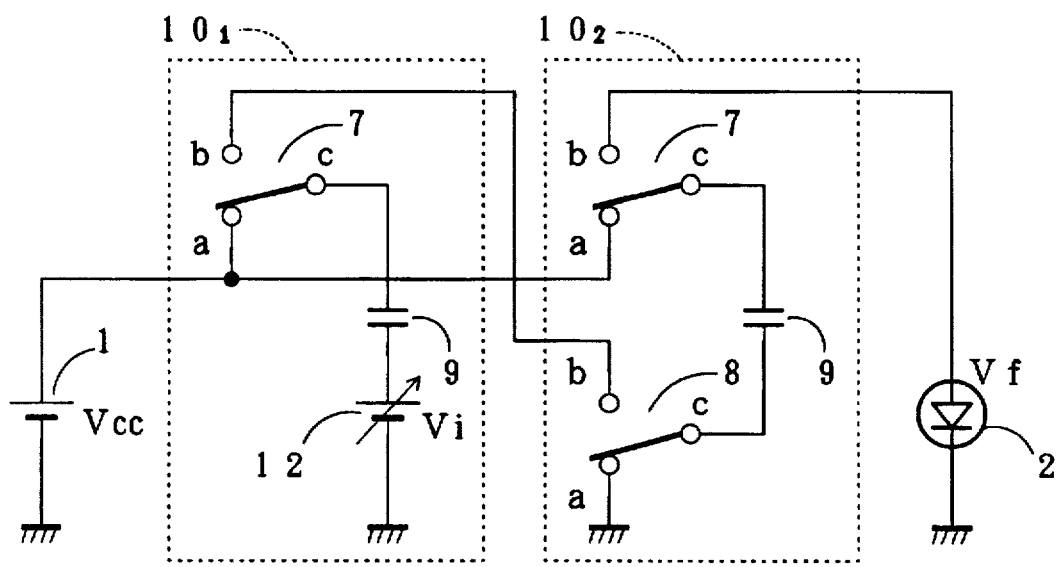
FIG. 8 is a circuit diagram of the fifth embodiment of a driving circuit according to the present invention.

FIG. 8 shows the fifth embodiment of the driving circuit according to the present invention.

In the fifth embodiment, in the driving circuit of FIG. 5, in place of the switch 8 in the first switched capacitor circuit $10_1$ nearest to the driving power supply 1, the saw-tooth wave generating circuit 12 is connected between the capacitor 9 and ground. In this case also, as in the driving circuit of FIG. 7, the instantaneous current i0 which starts to flow toward the light emitting element 2 can be made constant.

In the embodiments of the present invention described above, although at most two connection stages of the switched capacitor circuit 10 have been adopted, three or more stages of the switched capacitor circuit 10 may be connected in accordance with the relationship between the power supply voltage Vcc and the forward voltage Vf of the light emitting element. Further, in the embodiments, although a plus (+) potential was outputted as a driving voltage, a minus (−) potential may be outputted. In this case, the polarity of each element in the driving circuit should be inverted.

FIG. 9 shows an embodiment of a simple matrix display system configured using the driving circuit according to the present invention.

In this embodiment, nine light emitting elements $2_1$–$2_9$ arranged in a matrix are drive-controlled by the driving circuit according to the present invention. The individual light emitting elements $2_1$–$2_9$ are connected at cross-points of cathode scanning lines $15_1$–$15_3$ and anode driving lines $16_1$–$16_3$. The cathode scanning lines $15_1$–$15_3$ are sequentially scanned by a cathode scanning unit 17 and the anode driving lines $16_1$–$16_3$ are simultaneously driven by an anode drive unit 18. The driving circuits $19_1$–$19_3$ provided corresponding to the respective anode driving lines $16_1$–$16_3$ issue driving pulses simultaneously in parallel. The driving circuit $19_1$–$19_3$ have either one of the driving circuits shown in FIGS. 1, 4, 6 and 8 in accordance with the specification of a used system.

A scanning pulse generating unit 20 serves to generate scanning pulses for sequentially selecting the cathode scanning lines $15_1$–$15_3$ at predetermined intervals T on the basis of a clock from a clock generating unit 21. A light emitting data generating unit 22 serves to designate the number N of times of switch exchange for the light emitting element to emit light. A counter 23 serves to produce a switch exchange pulse for each of the light emitting elements to emit light. The clock sent from the clock generating unit 21 is divided by the number N of times of switch exchange from a light-emitting data generating unit 22 so that a switch exchange pulse for each of the light emitting elements is generated. These switch exchange pulses are sent as a serial signal to a serial-parallel conversion unit 24.

The serial-parallel conversion unit 24 divides the switch exchange pulses sent as a serial signal for each of the light emitting elements, and supply these pulses in an extended time axis, simultaneously in parallel, to the corresponding driving circuits $19_1$–$19_3$ in the anode driving unit 18.

An explanation will be given of the operation of the display system of FIG. 9 in connection with a light emitting element $2_5$ at a center position of the matrix of the light emitting elements $2_1$–$2_9$ is to be emitted.

Figure 10:
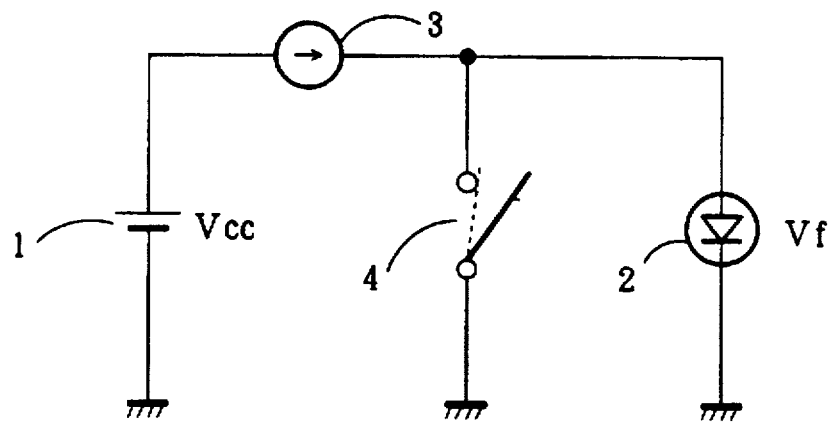
FIG. 10 is a circuit diagram of the first prior art.
Figure 11:
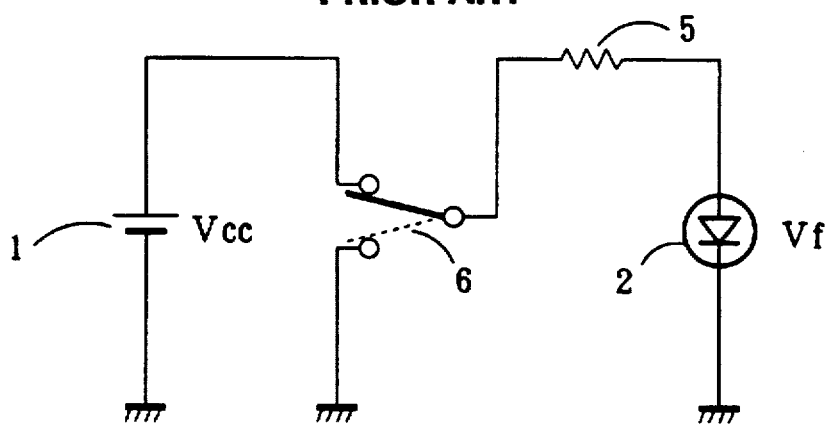
FIG. 11 is a circuit diagram of the second prior art.

The cathode scanning unit 17 sequentially selects the cathode scanning lines $15_1$–$15_3$ at predetermined intervals of T. In this selection, the selected cathode scanning line is connected to 0 V (ground) whereas the other cathode scanning lines not selected are connected to a voltage equal to the power supply voltage Vcc for the driving circuits $19_1$–$19_3$. Now when the cathode scanning line $15_2$ is selected, as shown in FIG. 10, the cathode scanning line $15_2$ is connected to 0 V (ground) and the other cathode scanning lines $15_1$ and $15_3$ are connected to Vcc.

In this state, as shown in FIG. 9, the counter 23 produces switch exchange pulses (1), (2) and (3) for the respective light emitting elements at intervals of Td=1/3·T. In this example, since only the light emitting element 25 of the above three light emitting elements $2_4$, $2_5$ and $2_6$ emits light, the switch exchange pulse is outputted at only the position of the second timing (2) corresponding to the light emitting element $2_5$.

The counter 23 divides the clock from the clock generating circuit 21 on the basis of the designated data of the number N of times of switch exchange sent from the light emitting data generating circuit 22 to produce N switch exchange pulses with the driving period Td at the position of the timing (2) and send these pulses to the serial-parallel conversion unit 24.

The serial-parallel conversion unit 24 separates the signals of (1), (2) and (3) sent from the counter 23 as serial signals to extend their time axes to three times 3·Td=T, and send these time-extended signals (1), (2) and (3) simultaneously in parallel to the corresponding driving circuit $19_1$–$19_3$.

In the case of this example, the time-extended switch exchange pulses of (2) are supplied to only the second driving circuit $19_2$. Thus, in response to switch exchange pulses of (2), the driving circuit $19_2$, as described above, exchanges the switches 7 and 8 in the switched capacitor circuit 10 (or $10_1$ and $10_2$ in FIG. 5) in accordance with the switch exchange pulses of (2).

Because of the switch exchange of the switches 7 and 8, the driving circuit $19_2$ supplies the driving current corresponding to the number N of times of switch exchange to the anode driving line $16_2$. The driving current flows through the light emitting element $2_5$ on the passage consisting of anode driving line $16_2$, light emitting element $2_5$, cathode scanning line $15_2$ and 0 V (ground). As a result, the light emitting element $2_5$ emits light with the luminance corresponding to the driving current.

By the repetition of the above operation at a period T, the light emitting element $2_5$ repeats the emission of light. Thus, with the period T set for 30 ms or shorter, because of an afterimage operation, human eyes recognize that the light emitting element $2_5$ is emitting light continuously.

Although several embodiments of the present invention have been explained, the present invention should not be limited to these embodiments. Several modifications can be proposed by those skilled in the art without departing the scope and spirit of the present invention.

What is claimed is:

1. A simple-matrix display system comprising:

a matrix for display elements composed of a plurality of cathode scanning lines, a plurality of anode drive lines and a plurality of light emitting elements arranged in a matrix at crossing points thereof; a cathode scanning unit for sequentially scanning said cathode scanning lines;

an anode driving unit for driving said anode driving lines simultaneously with a scanning operation of the cathode scanning unit;

a plurality of driving circuits, each comprising a light emitting element and a switched capacitor circuit including a capacitor for driving said light emitting element, said driving circuits being provided so as to correspond to the anode driving lines within said anode driving unit and supplying driving pulses to the display elements simultaneously in parallel;

a clock generating unit for generating clocks;

a scanning pulse generating unit for generating scanning pulses for sequentially selecting said cathode scanning lines at prescribed intervals on the basis of the clocks generated from said clock generating unit;

a light emission data generating unit for specifying the number of times of switch exchange of the light emitting elements to emit light;

a counter for creating a switch exchange pulse for each of the light emitting elements by dividing the clock sent from said clock generating unit by the number of times of switch exchange supplied from said light emitting data generating unit; and a serial-parallel conversion unit for converting the switch exchange pulse as a serial signal supplied from said counter into parallel signals and supplying them to said driving circuits in said anode driving unit.

2. A method of driving a light emitting element having a forward voltage Vf which is less than a supply voltage Vcc provided by a power supply, where a switched capacitor circuit including a capacitor and is connected between said light emitting element and said power supply, comprising:

charging said capacitor to a first voltage level Vcc during a first mode of operation, charging said capacitor to a second voltage level Vf during a second mode of operation, and discharging said capacitor when said capacitor is charged to said second voltage level Vf to drive said light emitting element.

3. The method as defined in claim 2, wherein said switched capacitor circuit further includes a plurality of switches, wherein said switches are switched to a first position during the first mode of operation, and wherein said switches are switched to a second position which is different from the first position during the second mode of operation.

* * * * *